United States Patent
Amirsakis

(12) 
(10) Patent No.: US 6,325,887 B1
(45) Date of Patent: Dec. 4, 2001

(54) HEAT-ACTIVATABLE POLYURETHANE/UREA ADHESIVE IN AQUEOUS DISPERSION

(75) Inventor: Charles J. Amirsakis, Lake Geneva, WI (US)

(73) Assignee: Morton International, Inc., Chicago, IL (US)

( * ) Notice: Subject to any disclaimer, the term of this patent is extended or adjusted under 35 U.S.C. 154(b) by 0 days.

(21) Appl. No.: 09/070,221

(22) Filed: Apr. 30, 1998

(51) Int. Cl.$^7$ .................................. C09J 101/00
(52) U.S. Cl. .................. 156/331.7; 524/591; 528/60
(58) Field of Search .................. 156/331.7; 528/60; 524/591

(56) References Cited

U.S. PATENT DOCUMENTS

| | | |
|---|---|---|
| 4,237,264 | 12/1980 | Noll et al. . |
| 4,408,008 | 10/1983 | Markusch . |
| 4,595,445 | 6/1986 | Hombach . |
| 4,829,122 * | 5/1989 | Pedain et al. ............... 524/591 |
| 5,124,400 | 6/1992 | Tirpak et al. . |
| 5,432,228 | 7/1995 | Hilken et al. . |
| 5,608,000 | 3/1997 | Duan et al. . |
| 5,652,299 | 7/1997 | Nakajima et al. . |
| 5,688,356 | 11/1997 | Sagiv . |
| 5,804,647 | 9/1998 | Nachtkamp et al. . |
| 5,907,012 * | 5/1999 | Voss et al. ............... 524/591 |

FOREIGN PATENT DOCUMENTS

| | | |
|---|---|---|
| WO 95/08583 | 3/1995 | (EP) . |
| 0 666 275 A3 | 9/1995 | (EP) . |
| 0 792 899 A1 | 2/1997 | (EP) . |
| 1143309 * | 2/1969 | (GB) ............... 524/591 |

OTHER PUBLICATIONS

"Waterborne Polyurethanes", Rosthauser, James W.; Nachtkamp, Klaus, Mobay Corp., Pittsburgh, PA, USA, Advances in Urethane Science and Technology (1987), 10, pp. 121–162.

* cited by examiner

*Primary Examiner*—John J. Gallagher
(74) *Attorney, Agent, or Firm*—Stephen T. Falk

(57) ABSTRACT

A stable colloidal aqueous dispersion of a partially and homogeneously crosslinked polyurethane/polyurea is made by inserting an integral emulsifier and an internal dispersion stabilizer into a polyurethane having a polyester- or polycaprolactone diol backbone and chain extending and crosslinking it with a mixture of diamine and triamine having a functionality of from 2.05 to 2.18. A highly concentrated solution of a dihydroxycarboxylic acid in a solvent such as N-methyl pyrrolidone permits the hydroxyl groups to react thoroughly and quickly with an isocyanate-terminated polyurethane and, consequently, a minimal amount of the solvent is present in the adhesive after water is removed from the aqueous dispersion. The adhesive is thus heat resistant at 70° C. despite its relatively small degree of crosslinking.

36 Claims, 1 Drawing Sheet

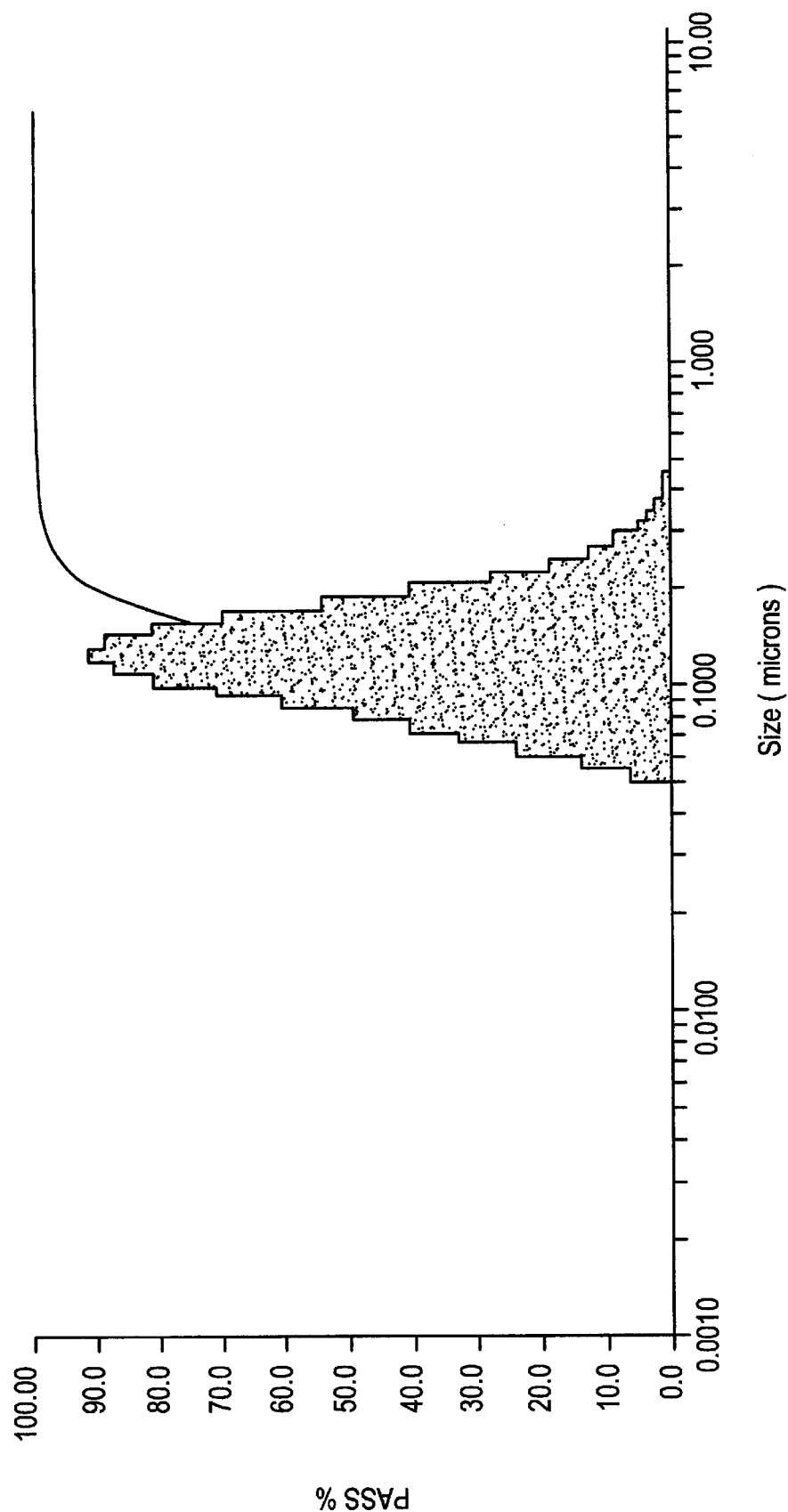

HEAT-ACTIVATABLE POLYURETHANE/ UREA ADHESIVE IN AQUEOUS DISPERSION

BACKGROUND OF THE INVENTION

This invention relates to stable colloidal aqueous dispersions of partially and homogeneously crosslinked polyurethane/polyurea adhesives that are heat activatable at 70° C., and have high bond strengths and good heat resistance at 70° C. It relates more particularly to dispersions wherein the average size of the adhesive particles is about 0.12 micron and in which the particle size distribution is very narrow.

Chemical resistance, toughness, elasticity, and durability are desirable properties of polyurethane/polyurea resins (sometimes referred to hereinafter as PUR resins) used as adhesives and coatings for fabrics, plastics, wood, glass fibers, and metals. Good initial green strength, a low heat activation temperature, and high heat resistance are necessary properties of such resins when they are being considered for use as adhesives in the manufacture of such dissimilar products as automobiles and shoes. Prior to this invention, two-component systems (e.g., a PUR resin+an ethylene vinyl acetate polymer) have been used generally to provide the combination of high heat resistance, good contactability, good green strength, and low activation temperature required by auto manufacturers for their assembly of dashboards and door panels, and installation of carpets and headliners. External crosslinking agents usually have been required for the PUR resin adhesives of the prior art. One U.S. auto manufacturer's specifications require an aqueous dispersion of an adhesive that achieves good bond strength when activated on the substrate at 70° C. without the need for an external crosslinking agent and retains that strength upon prolonged exposure to such heat.

The shoe industry requires its adhesives to have very high initial tack and green strength, quick bonding of PVC, rubber, fabric, and leather substrates, and excellent heat- and water resistance. It has been very slow to adapt to aqueous adhesives because of such requirements.

Aqueous dispersions of anionic polyurethane compositions which can be one component or two component adhesives are taught in U.S. Pat. No. 5,608,000, which is incorporated herein by reference. The polyurethane backbone of the adhesive of said patent comprises the reaction product of an isocyanate terminated prepolymer, a chain extending diamine, and a chain stopping aminoalcohol. A sulfonated polyester polyol group is incorporated into the polyurethane as an internal emulsifier. Conventional crosslinkers for isocyanate-terminated polyurethanes are taught to be less than optimal because their use requires a high level of chain extending diamine which makes it more difficult to maintain a stable dispersion. The preferred method of crosslinking, according to this patent, is by reaction at room temperature of carboxylic acid groups incorporated in the polyurethane with a crosslinker such as a polyfunctional aziridine compound.

SUMMARY OF THE INVENTION

It is an object of this invention to provide a polyurethane/ polyurea which is partially and homogeneously crosslinked with a triamine to give a stable aqueous dispersion which is useful as a low-temperature heat activatable adhesive.

It is another object of the invention to provide a stable, colloidal aqueous dispersion of a polyurethane/polyurea adhesive which can be activated when heated to about 60–70° C.

It is another object of the invention to provide a partially crosslinked polyurethane/polyurea adhesive that provides good initial green strength and is heat resistant at 70° C.

These and other objects which will become apparent from the following description of the invention are achieved by a stable aqueous dispersion of a heat-activatable adhesive comprising a partially and homogeneously cross-linked polyurethane/polyurea wherein the polyurethane segment contains an integral ionic emulsifier and the polyurea segment, which contains an integral emulsion stabilizer, is a product of a chain extension of an isocyanate-terminated polyurethane with mixture of amines comprising an aliphatic diamine and an aliphatic triamine having three primary amino groups, said mixture having a functionality of from 2.05 to 2.18, and, optionally, reacting a portion of the isocyanate-terminated polyurethane with a monoaminoalkanol, an aminoacid, a vinyl-substituted amine, or a mixture of two or more of said amines.

Said objects are achieved also by a process for the preparation of a stable aqueous dispersion of a partially cross-linked polyester-based polyurethane/polyurea which comprises:

a) forming a solution in a high boiling, water-soluble organic solvent that is inert toward the isocyanate group of at least about 36% by weight of a dihydroxycarboxlic acid having up to 12 carbon atoms at from about 40 to about 80° C.;

b) forming an isocyanate-terminated polyurethane by reacting a stoichiometric excess of an aliphatic diisocyanate with a polyesterdiol or polycaprolactone diol or mixture thereof with from about 0.02 to about 0.05 of said dihydroxycarboxlic acid per hundred grams of final dry polyurethane/polyurea;

c) adding a water-soluble ketone before or after the reaction occurs to form a solution of the isocyanate-terminated polyurethane;

d) adding a monoamine containing a hydrophilic oxyalkylene moiety with a second portion of the diisocyanate, and neutralizing the carboxylic acid moiety with a tertiary amine;

e) dispersing the isocyanate-terminated polyurethane in water by adding water to the ketone solution thereof at a rate of from about 600 to about 900 mls/sec;

f) forming a mixture of ketimines by dissolving an aliphatic diamine and an aliphatic amine having three primary amino groups in a water-soluble ketone, the amine mixture having a functionality of from 2.05 to 2.18;

g) optionally, adding a monoaminoalkanol, an aminoacid, a vinyl substituted amine, or a mixture of said amines to the amine mixture, and h) adding the mixture of ketimines to the aqueous dispersion, whereby the ketimines hydrolyze to the original amines and ketone, and reacting the amines with the isocyanate-terminated polyurethane to form the polyurethane/polyurea, and removing the water-soluble ketone by distillation.

FIG. 1 is a graph of the particle size of the adhesive.

DETAILED DESCRIPTION OF THE INVENTION

The polyesterdiols used in the preparation of a polyurethane are preferably linear and have a weight average molecular weight of from about 750 to about 5600, preferably greater than about 1600 and more preferably from about 2800 to about 3200. The hydroxyl number may be from about 20 to about 150 but is preferably from about 20 to about 70 and more preferably from about 30 to about 40. They may be produced by a conventional procedure in which one or more dicarboxylic acids and one or more glycols are heated in the presence of an acid catalyst until the acid number is reduced to about 30 or less, preferably less than 1, more preferably less than 0.8. Transesterification of a dicarboxylic acid ester by reaction with one or more of such glycols is also suitable. The glycol to acid mole ratio is preferably greater than one so as to obtain linear chains having a preponderance of terminal hydroxyl groups.

The ester-forming glycols may be aliphatic, cycloaliphatic, aromatic or mixtures thereof. Examples of the glycol component include alkylene glycols having from 2 to 10 carbon atoms as exemplified by ethylene glycol, 1,2-propanediol, 1,4-butanediol, 2,6-hexamethylenediol, and mixtures thereof. ethylene glycol, propylene glycol, 1,3-propanediol, 1,4-butanediol, 1,5-pentanediol, 1,6-hexanediol, neopentyl glycol, diethylene glycol, dipropylene glycol, 2-methyl-1,3-propane diol; 2-butyl-2-ethyl-1,3-propane diol; 2,2,4-trimethyl-1,3-pentanediol; cyclohexanedimethanol, ethylene oxide and propylene oxide adducts of bisphenol A, ethylene oxide and propylene oxide adducts of hydrogenated bisphenol A, polyethylene glycol, polypropylene glycol, polytetramethylene glycol, and the like.

The dicarboxylic acid component of the polyesterdiol is predominantly aliphatic and includes cycloaliphatic acids, aromatic acids which have aliphatic substituents of eight or more carbon atoms, and mixtures thereof. Suitable aliphatic dicarboxylic acids include succinic, adipic, azelaic, sebacic, and dodecanedioc acid, and alicyclic dicarboxylic acids such as cyclohexanedicarboxylic acid, hydrogenated 2,6-naphthalenedicarboxylic acid and the like. An anhydride may be used in place of or with the acid.

Polyesterdiols made from adipic acid and 1,6-hexanediol or 1,4-butanediol and mixtures thereof are preferred for the purposes of this invention.

The average molecular weight of the polycaprolactone diols used as intermediates in the preparation of a polyurethane of this invention is the same that given above for the polyesterdiols. The polycaprolactone diols are made by the reaction of caprolactone and an excess of an alkylene glycol in accordance with conventional procedures.

The amount of the dihydroxycarboxylic acid in admixture with the diol is from about 0.02 to about 0.05 equivalent per hundred grams of the final polyurethane/polyurea being made after drying. The α,α-dimethylol alkanoic acids are preferred as the dihydroxycarboxylic acid; 2,2-dimethylolpropionic acid is particularly preferred. The diol reacts with the diisocyanate along with the polyesterdiol and imparts its potential ionic character to the isocyanate-terminated prepolymer (i.e., the polyurethane) first formed in the method of this invention. The high boiling, water-soluble solvent is inert toward the isocyanate group and has a boiling point of from 160 to 210° C.; it is exemplified by N-methyl-2-pyrrolidone. The introduction of the acid into the diol as a solution in the high boiling solvent promotes a quick and thorough distribution of the acid in the diol before the introduction of the diisocyanate and prevents isolated localized reactions of the diisocyanate with solid particles of the acid. The high concentration of the acid in the solution minimizes the amount of high boiling solvent that remains in the stripped aqueous dispersion and ultimately in the adhesive. A low concentration of the high boiling solvent is preferred in order to obtain an adhesive having good green strength and good heat resistance when the functionality of the mixture of chain extending diamines and crosslinking triamines is so low as in this invention. For that reason, the amount of high boiling solvent in the aqueous dispersion is from about 1.0 to about 1.5%, preferably about 1.2%, by weight.

After conversion of the potentially ionic carboxylic group to an ionic group by salt formation with the tertiary amine, the concentration of ionic groups in the polyurethane may be from about 0.005 to about 0.015 per 100 grams but it is preferably about 0.013 equivalent per 100 grams. Too much of the ionic group will prevent the heat activation of the adhesive at 60–70° C. that is so important.

The maximum diisocyanate content of the diol/diisocyanate mixture is about 25% by weight and it is preferred to be from about 12 to about 18%. Suitable diisocyanates are predominantly aliphatic in character and are exemplified by isophorone diisocyanate; m-tetramethylxylenediisocyanate; ptetramethylxylene diisocyanate; 4,4'-diisocyanatodicyclohexane; tetramethylenediisocyanate; 1,4-diisocyanatomethylcyclohexane; 4,4'-diisocyanatodicyclohexylmethane; 1,6-hexanediisocyanate, and 1,3-diisocyanatomethylcyclohexane.

In a preferred embodiment of the method of this invention, the mixture of the diol and the solution of the acid in the high boiling water-soluble solvent are heated to a temperature of from about 80 to about 100° C. and then the diisocyanate is added in one quick charge. The reaction is exothermic but it is preferred to hold the temperature at from about 85 to 90° C. Vigorous stirring is maintained in this and the following steps.

It is desirable to use a water-soluble ketone to dilute the prepolymer so as to maintain the reactants in the liquid state and help control the temperature during the next steps of the method for preparing the aqueous dispersions of this invention. At this stage, the amount of ketone is from about 20 to about 30%, by weight, of the total solution. The ketone is also a reactant in the formation of blocked amines known as ketimines in the next step of the method. A super-atmospheric pressure may be imposed to prevent boiling of the ketone.

After the isocyanate-terminated prepolymer has been dissolved in acetone or other water soluble ketone, an internal stabilizer is formed in the polyurethane by reacting from about 4 to about 6%, preferably about 5%, by weight of the polyurethane, of a hydrophilic oxyalkylene group-containing monoamine with the equivalent amount of the excess diisocyanate. The internal stabilizer thus comprises hydrophilic urea groups on the polyurethane chain. The hydrophilic monoamine may be made by alkoxylating an alkanolamine with ethylene oxide or propylene oxide or a mixture of the two. The weight average molecular weight of the monoamine is from about 600 to about 2000. An alkoxylated hydroxypropylamine having a polyethylene glycol backbone and containing 30% by weight of randomly incorporated propylene oxide, sold under the trademark JEFFAMINE M-2070 by the Huntsman Corporation, is particularly preferred for the preparation of an adhesive of this invention. A propylene oxide adduct of an aminoalkyl phenol, available from Clariant Corporation, and having the formula $H_2NCH_2CH(CH_3)C_6H_4O—(CH_2CH(CH_3)CH_2O)_{30}H$, is also suitable.

It is preferred to dissolve the monoamine in the ketone and allow the solution to age for at least about 2 hours to form a ketimine before it is added to the prepolymer to facilitate thorough mixing of the reactants. The ketimine releases the amine to react with the terminal isocyanate groups at a temperature of from about 35 to about 40° C. The amount of hydrophilic monoamine used, based on the weight of the dry polyurethane/polyurea being made, is from about 0.002 to about 0.008 equivalent per 100 grams of the polyurethane/polyurea.

The conversion of the carboxylic acid moiety in the polyurethane to an anionic group may be undertaken along with the formation of the internal stabilizer by adding a tertiary amine to the solution of the monoamine. Tertiary amines lacking active hydrogens as determined by the Zerewitinoff test are preferred because they would be capable of reacting with the isocyanate groups of the prepolymer and cause gelation or chain termination. A trialkyl-substituted amine such as triethylamine is particularly preferred.

In contrast to procedures in the prior art, wherein water is added slowly to the polyurethane prepolymer, the formation of an aqueous dispersion of the anionic polyurethane prepolymer with urea groups derived from the monoamine is achieved in this invention by adding cool water (~50° F.; ~10° C.) at a minimum rate of about 600, preferably about 900, mls/sec (from about 1 to 1.5 gallons per minute) or more quickly if possible. The quick addition has the effects of hydrolyzing all of the ketimine to the monoamine very quickly to free the amine for reaction with an equivalent portion of the diisocyanate remaining in the reaction mixture and cooling the reaction mixture quickly to about 15–25° C., preferably less than about 20° C., to minimize reaction between the water and the diisocyanate.

High bond strengths and heat resistance at 70° C. are achieved by the chain extension of the polyurethane with from about 0.033 to about 0.038 equivalent of a diamine per hundred grams of the dry final polymer and a homogeneously partial crosslinking of the polymer with from about 0.002 to about 0.007 equivalent per hundred grams of the dry final polymer of a triamine in which all of the amino groups are primary and thus have the same reactivity. Examples of a suitable triamine include 1,5,11-triaminoundecane, tris(2-aminoethyl)amine, and, preferably, 4-aminomethyl-1,8-diamino octane (also known as triaminononane or TAN). Other tri- or higher poly-amines in which all of the amino groups are primary may also be used.

Suitable diamines include ethylenediamine, propylenediamine, 1,4-butylenediamine; 1,3-pentanediamine, hexamethylenediamine, 2-methylpentamethylenediamine, 1,4-cyclohexyldimethyldiamine, isophorone diamine, and, preferably, 1,2-diaminocyclohexane (or DCH).

All of the amino groups in the chain extender and in the crosslinker are primary.

To achieve a homogeneous chain extension and homogeneous partial crosslinking, the amines are blocked by reaction with a water-soluble ketone to form a ketimine. A mixture of the amines is aged in the ketone solution for at least about 2 hours. Acetone is a preferred ketone. To take advantage of the low temperature of the reaction mixture after the water cooling step, the ketimines are preferably added within about 15 minutes of the water addition at a rate of about 20–30 grams per minute. The ketimines are hydrolyzed immediately to the corresponding diamine and triamine and the high dilution of the polyurethane prepolymer in the aqueous dispersion favors the homogeneous crosslinking wherein a large proportion of individual chains are crosslinked rather than a few chains being highly crosslinked while some chains are not crosslinked at all.

The final product is a stable aqueous dispersion of colloidally sized particles of a partially crosslinked polyurethane/polyurea having a solids content of from 50–55% by weight and a viscosity of about 500–600 cps and in which the particle size distribution is from 0.07 to 0.24 micron (see FIG. 1) and the average particle size is about 0.12 micron (120 nanometers). The dispersed adhesive has excellent green strength.

The option of adding an aminoalcohol is chosen when the homogeneous partial crosslinking of the polyurethane/polyurea by the mix of diamines and triamines having a functionality of 2.18 or less yields a softening point which is too low when the adhesive is to be used in tropical areas of the world. In that situation, an additional charge of diisocyanate may be added to crosslink two chains containing hydroxyl groups furnished by the aminoalcohol. Ethanolamine, propanolamine, butanolamine, and N-methylethanolamine are examples of suitable aminoalcohols. The choice of an aminoacid provides carboxylic acid groups on the polyurea segment which enhance the adhesive power of the polyurethane/polyurea of this invention. Examples of an amino acid include glycine and 6-aminocaproic acid. The reaction of a vinyl-substituted primary amine with isocyanate groups remaining on the polyurethane/polyurea provides sites for radiation curing of the adhesive with ultra-violet light or an electron beam with the aid of photoactivated initiators and accelerators. An aminostyrene is an example of a vinyl-substituted amine.

Additives such as anti-foam agents, biocides, fillers, dyes, and pigments may be added to impart desirable properties to the dispersion and/or to the adhesive in it.

The end products of the process of this invention are suitable as adhesives for textiles, leather, paper, cardboard, wood, glass, metals, ceramics, foamed resins, and plastics.

The dispersion is applied to such substrates and dried at from 60–70° C. for 15–20 minutes in an oven, the substrates are removed and the surfaces are again heated to 60–70° C. to activate the adhesive and the substrates are pressed together to form a bond.

The invention is illustrated further but is not limited by the following examples.

EXAMPLE 1

A solution containing 36.4% by weight of dimethylol propionic acid in a high boiling solvent was prepared by holding a mixture of 279 grams (4.16 eq.) of dimethylol propionic acid and 489 grams of N-methyl-2-pyrrolidone at 40° C. until all solids disappeared. The hot solution was added to 12,187 grams (8.34 equivalents) of a molten polyesterdiol (1,6 hexanediol plus adipic acid; OH#38.39) with stirring and the temperature was at 80–85° C. when 2364 grams (21.3 eq.) of isophorone diisocyanate was added quickly. The exothermic reaction raised the temperature to about 95° C. and the reaction was continued at 85–90° C. for about 4 hours. Then 5044 grams of acetone at room temperature was added to the prepolymer and mixing was continued for about 30 minutes as the temperature was reduced to about 35–40° C. Then, a solution of 834 grams (4.03 eq.) of a monoamine of a polyethylene/polypropylene glycol (Jeffamine 2070) and 211 grams (2.08 eq) of triethylamine in 834 grams of acetone (the solution having been aged at room temperature for 15 hrs) was added and the mixture was stirred for about 30 minutes. The mixer speed was increased to 240 rpm and 15,362 grams of de-ionized water was added in about 20 seconds. After about 5 minutes of stirring, the temperature had dropped to about 17° C. With the mixer at 240 rpm, a solution of 310 grams (5.43 eq) of diaminocyclohexane, 68 grams (1.17 eq.) of triaminononane, and 131.6 grams (1.75 eq) of 3-aminopropanol in 1468 grams of acetone (the solution having been aged at room temperature for 15 hrs) was metered into the prepolymer solution in about 10 minutes. The reaction mixture was stirred for about 5 minutes. A mixture of 6.5 grams of Foam Master AP anti-foam agent, 65 grams of AMICAL biocide, and 550 grams of de-ionized water was added to the stirred dispersion and the acetone was stripped off under a reduced pressure of 10 mmHg at 17–29° C. to yield an aqueous dispersion containing 49% of the adhesive solids of this invention. The Brookfield viscosity was 540 cps (spindle #2, 20 rpm, 23° C., Brookfield RVT).

The dispersion was applied to a strip of rubber, the strip was cut in half, dried in an oven at 70° for about 15 minutes, and folded over itself so as to bring the adhesive layers into contact. The folds were pressed together and returned to the 70° oven for 10 minutes. The strips were then removed and the aperture, if any, between the folded halves of the strip was measured as a test of the initial bond strength (green strength). No separation was observed.

The heat resistance of the adhesive was measured as follows: The dispersion was applied to two 12 cm long cotton strips and dried at room temperature. The adhesive was activated on each strip by heat from an infra-red lamp and the two strips were bonded together immediately, except for a portion at the end of each, in a hydraulic press. After 24 hours, a 2.27 kg weight was hung from the unbonded area of the strip and it was placed in an oven for 3 hours as the temperature was increased from 50 to 70° C. No failure of the adhesive was observed at the end of the test period.

The subject matter claimed is:

1. A method for the preparation of a stable aqueous dispersion of a partially crosslinked polyester-based polyurethane/polyurea which comprises:
   (a) forming a solution at from about 40 to about 80° C. of at least about 36% by weight of a dihydroxycarboxylic acid having up to 12 carbon atoms in a high boiling, water-soluble organic solvent this is inert toward the isocyanate group;
   (b) forming an isocyanate-terminated polyurethane by reacting a stoichiometric excess of an aliphatic diisocyanate with at least one diol selection from the group consisting of a polyesterdiol and polycaprolactone diol and with from about 0.02 to 0.05 equivalent of said dihydroxycarboxylic acid per hundred grams of final dry polyurethane/polyurea;
   (c) adding a water-soluble ketone before or after the reaction occurs to form a solution of the isocyanate-terminated polyurethane;
   (d) reacting a monoamine containing a hydrophilic oxyalkylene moiety with the isocyanate-terminated polyurethane and neutralizing the carboxylic acid moiety with a tertiary amine;
   (e) then dispersing the neutralized isocyanate-terminated polyurethane in water by adding water to the ketone solution thereof at a minimum rate of about 600 mls/sec to form an aqueous disperson;
   (f) forming a mixture of ketimines by dissolving an aliphatic diamine and an aliphatic amine having three primary amino groups in a water-soluble ketone, the amine mixture having a functionality of from 2.05 to 2.18; and
   (g) adding the mixture of ketimines to the aqueous dispersion, whereby the ketimines hydrolyze to the original amines and ketone, and reacting the amines with the isocyanate-terminated polyurethane to form the polyurethane/polyurea, and removing the water-soluble ketone.

2. The method of claim 1 wherein the water is added at a minimum rate of about 900 mls/sec.

3. The method of claim 1 wherein the reaction of the diisocyanate with the diol occurs at a temperature of from about 85 to about 95° C.

4. The method of claim 1 wherein the ketone is added after the the reaction of the diisocyanate with the diol.

5. The method of claim 1 wherein the dihydroxycarboxylic acid is dimethylolpropionic acid.

6. The method of claim 5 wherein the diisocyanate is isophorone diisocyanate.

7. The method of claim 6 wherein the hydrophilic oxyalkylene moiety of the monoamine is a hydroxyl-free residue of a polyalkylene ether having randomly occurring oxyethylene and oxypropylene units.

8. The method of claim 7 wherein the oxyethylene units constitute about 70% by weight of the polyether residue.

9. The method of claim 8 wherein the ketone is acetone.

10. The method of claim 2 wherein the acid is dimethylolpropionic acid, the diisocyanate is isophorone diisocyanate, the hydrophilic oxyalkylene moiety of the monoamine is a hydroxyl-free residue of a polyalkylene ether having randomly occurring oxyethylene and oxypropylene units wherein the oxyethylene units constitute about 70% by weight of the polyether residue, the triamine is 4-aminomethyl-1,8-diaminooctane, and the ketone is acetone.

11. The method of claim 1 wherein the amount of the hydrophilic monoamine is from about 0.002 to about 0.008 equivalent per 100 grams of the polyurethane/polyurea.

12. The method of claim 1 wherein the amount of diamine is from about 0.033 to about 0.38 equivalent per hundred grams of the polyurethane/polyurea.

13. The method of claim 1 wherein the amount of triamine is from about 0.002 to about 0.007 equivalent per hundred grams of polyurethane/polyurea.

14. The method of claim 11 wherein the amount of diamine is from about 0.033 to about 0.38 equivalent per hundred grams of the polyurethane/polyurea.

15. The method of claim 12 wherein the amount of triamine is from about 0.002 to about 0.007 equivalent per hundred grams of polyurethane/polyurea.

16. The method of claim 15 wherein the amount of the hydrophilic monoamine is from about 0.002 to about 0.008 equivalent per 100 grams of the polyurethane/polyurea.

17. The method of claim 1 wherein the amount of the dihydroxycarboxylic acid is from about 0.02 to about 0.05 equivalent per 100 grams of the polyurethane/polyurea.

18. A method for adhesively bonding a first and a second substrate comprising applying the aqueous dispersion prepared by the method of claim 1 to the substrates, drying the dispersion, heat-activating the polyurethane/polyurea, and pressing the substrates together.

19. A method for adhesively bonding a first and a second substrate comprising applying the aqueous dispersion prepared by the method of claim 8 to the substrates, drying the dispersion, heat-activating the polyurethane/polyurea and pressing the substrates together.

20. A method for adhesively bonding a first and a second substrate comprising applying the aqueous dispersion prepared by the method of claim 16 to the substrates, drying the dispersion, heat-activating the polyurethane/polyurea and pressing the substrates together.

21. A stable aqueous dispersion of a heat-activatable adhesive comprising a partially, homogeneously cross-linked polyurethane/polyurea which comprises an integral ionic emulsifier, an internal emulsion stabilizer, and a product of a chain extension and crosslinking of an isocyanate-terminated polyurethane by a mixture of amines consisting of an aliphatic diamine and an aliphatic triamine having three primary amino groups, and having a functionality of from 2.05 to 2.18.

22. The dispersion of claim 21 further comprising from about 1.0 to about 1.5% by weight of a high boiling, water-soluble organic solvent that is inert toward an isocyanate group.

23. The dispersion of claim 22 wherein the solvent is N-methyl pyrrolidone.

24. The dispersion of claim 21 wherein the aliphatic triamine is 4-aminomethyl-1,8-diaminooctane.

25. The dispersion of claim 23 wherein the aliphatic triamine is 4-aminomethyl-1,8-diaminooctane.

26. The dispersion of claim 21 characterized further by a solids content of from about 50 to about 55% by weight.

27. The dispersion of claim 21 characterized further by a particle size distribution range of from 0.07 to 0.24 micron.

28. An adhesive comprising a polyurethane/polyurea having an integral ionic emulsifier and an internal emulsion stabilizer and a polyesterdiol backbone homogeneously chain extended and homogeneously partially crosslinked by a mixture of diamines and triamines having a functionality of from 2.05 to 2.18 and further comprising a high boiling, water-soluble organic solvent that is inert to an isocyanate group.

29. The adhesive of claim 28 wherein the solvent is N-methyl-pyrrolidone.

30. The adhesive of claim 29 further characterized by heat resistance at 70° C.

31. The method of claim 1 wherein the monoamine of step d) contains a hydrophilic oxyalkylene moiety having a weight average molecular weight of from about 600 to about 2000.

32. The method of claim 1 wherein the monoamine of step d) is a propylene oxide adduct of an aminoalkyl phenol having the formula $H_2NCH_2CH(CH_3)C_6H_4O-(CH_2CH(CH_3)CH_2O)_{30}H$.

33. The dispersion of claim 21 wherein the internal stabilizer comprises the reaction product of the isocyanate-terminated polyurethane with a monoamine containing a hydrophilic oxyalkylene moiety and having a weight average molecular weight of from about 600 to about 2000.

34. The dispersion of claim 21 wherein the internal stabilizer comprises the reaction product of the isocyanate-terminated polyurethane with a propylene oxide adduct of an aminoalkyl phenol having the formula $$H_2NCH_2CH(CH_3)C_6H_4O-(CH_2CH(CH_3)CH_2O)_{30}H$$

and the polyurethane before chain extension and crosslinking.

35. The adhesive of claim 28 wherein the internal stabilizer comprises a hydrophilic urea group containing a hydrophilic oxyalkylene moiety having a weight average molecular weight of from about 600 to about 2000.

36. The adhesive of claim 28 wherein the internal stabilizer comprises a hydrophilic urea group which is the reaction product of a propylene oxide adduct of an aminoalkyl phenol having the formula $$H_2NCH_2CH(CH3)C_6H_4O-(CH_2CH(CH_3)CH_2O)_{30}H$$

and the polyurethane formed before chain extension and crosslinking.

* * * * *